(12) United States Patent
Raento et al.

(10) Patent No.: US 8,319,685 B2
(45) Date of Patent: Nov. 27, 2012

(54) MOBILE DEVICE BATTERY MANAGEMENT

(75) Inventors: Mika Raento, Helsinki (FI); David S. Maynard, Menlo Park, CA (US); Steven John Lee, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,396

(22) Filed: Sep. 26, 2011

(65) Prior Publication Data

US 2012/0013504 A1 Jan. 19, 2012

Related U.S. Application Data

(63) Continuation of application No. 12/686,982, filed on Jan. 13, 2010.

(60) Provisional application No. 61/149,999, filed on Feb. 4, 2009.

(51) Int. Cl.
*G01S 19/34* (2010.01)
*G01S 19/48* (2010.01)

(52) U.S. Cl. ............................. 342/357.74; 342/357.31

(58) Field of Classification Search ............. 342/357.31, 342/357.74; 455/343.2, 456.1–456.6
See application file for complete search history.

(56) References Cited

U.S. PATENT DOCUMENTS

| 6,850,188 | B1 | 2/2005 | Lee et al. | |
| 7,359,713 | B1* | 4/2008 | Tiwari | 455/456.1 |
| 7,643,834 | B2 | 1/2010 | Ioppe et al. | |
| 2003/0158609 | A1 | 8/2003 | Chiu | |
| 2006/0121954 | A1 | 6/2006 | Mock | |
| 2008/0032703 | A1 | 2/2008 | Krumm et al. | |
| 2009/0219209 | A1* | 9/2009 | Bush et al. | 342/450 |
| 2009/0280826 | A1 | 11/2009 | Malik et al. | |

FOREIGN PATENT DOCUMENTS

WO WO 2008/067261 6/2006

OTHER PUBLICATIONS

"jaikuengine-mobile-client" [Online], Google, [Retrieved on Mar. 23, 2010]. Retrieved from the internet: http://code.google.com/p/jaikuengine-mobile-client/.

(Continued)

*Primary Examiner* — Jack W Keith
*Assistant Examiner* — Cassie Galt
(74) *Attorney, Agent, or Firm* — Fish & Richardson P.C.

(57) ABSTRACT

In general, the subject matter described in this specification can be embodied in methods, systems, and program products. Data representing a plurality of power management profiles for a battery-operated wireless computing device are stored on the device. The power management profiles correspond to different power consumption levels. Each power management profile defines a feature for determining a geographic location of the device from among a plurality of features that are available for determining the geographic location of the device, and a frequency for employing the feature to determine the geographic location of the device. A first battery level of the device is determined. If the determined battery level is lower than a first predetermined amount, the device switches from a first power management profile having a first consumption level to a second power management profile having a second consumption level that is lower than the first consumption level.

28 Claims, 8 Drawing Sheets

OTHER PUBLICATIONS

Laasonen, Kari, Raento, Mika, and Toivonen, Hannu, "Adaptive On-Device Location Recognition" Basic Research Unit, Helsinki Institute for Information Technology Department of Computer Science, University of Helsinki, date unknown, pp. 287-304.

Chapter 14: Where am I? Finding Your Way with Core Location, date unknown, pp. 429-432 and 435.

"Glenn 95—The Nokia N95 user: Get Located using Phone Locator for S60" [online]. [retrieved on Dec. 8, 2009] [published on Aug. 19, 2008]. Retrieved from: http://nokian95user.blogspot.com/2008/08/get-located-using-phonelocator, pp. 1-4.

Invitation to Pay Additional Fees for Application No. PCT/US2010/023000, dated Jun. 5, 2010, 7 pages.

International Search Report & Written Opinion for Application No. PCT/US2010/023000, dated Jul. 19, 2010, 19 pages.

Official USPTO communication in U.S. Appl. No. 13/245,396, dated Mar. 16, 2012.

* cited by examiner

MOBILE DEVICE BATTERY MANAGEMENT

RELATED APPLICATIONS

This application is a continuation of U.S. application Ser. No. 12/686,982 filed on Jan. 13, 2010, which claims the benefit of U.S. Provisional Application No. 61/149,999, titled "Mobile Device Battery Management," filed Feb. 4, 2009. The disclosures of those applications are incorporated herein by reference.

TECHNICAL FIELD

This document relates to systems and techniques for managing power consumption on computing devices, such as mobile devices.

BACKGROUND

Mobile computing devices, such as smartphones, are becoming ever more powerful, both in terms of processing power and in terms of capabilities. Such expanded capabilities include capabilities to determine the geographic location of a device. For example, global positioning system (GPS) receivers on mobile devices can provide very fine positioning capabilities and are becoming very common on mobile devices. Other approaches, such as finding or at least estimating a location of a device using WiFi access points and Cell ID's can also be used. Such features may be particularly useful for various on-line location-based services that provide rich applications that, for proper functioning, need to be able to determine a user's location automatically. One such type of location-based service includes applications for identifying the current up-to-date locations of a user's friends or acquaintances. Such services can generate a map that is overlaid with an icon of each one of a user's friends. The services can help the friends determine that they should meet for food, drink, or just conversation, if they are proximate to each other.

Location-based services (LBS) can be expensive, however, in turns of electrical power consumption. The use of regular GPS readings to constantly pinpoint a user's location can cut a smartphone's battery time in half or more. Readings from WiFi access points generally require less power, but enough that repeated readings will also substantially decrease observed battery life for a user of such devices.

SUMMARY

This document describes systems and techniques that may be used to determine the location of a battery-operated device, such as a smartphone, without unduly using battery power from such a device. In general, lower-powered techniques for determining and reporting location are used here for relatively frequent measurements, and even these techniques are employed less frequently when a user is determined to not be moving or when a battery level on a device has fallen. Techniques that require more power from a device are reserved for particular situations in which closer tracking of a device is deemed to be desired by a user. The frequency with which a device determines and reports its location thus varies as a rough function of the need to report location, and in a manner aimed at reducing battery consumption to an acceptable level.

The determination of whether a user is moving my require some computation because certain minor or oscillating motion should not be taken as actual motion by a system. For example, a user of a mobile device might just be pacing back-and-forth inside a room if a system indicates minor oscillating motion, or conditions may change so that one local cell tower obtains a different signal from the device, so that the device is perceived by the system to be moving even though it is not. As discussed below, for example, cell ID and WiFi access point information can be used to determine whether a device is stationary or moving, where the status of a user can be determined with respect to a cluster of cells that are in proximity to each other.

The techniques described here may also involve particular methods by which a mobile device may report its location to a location-based service that is remote from the device. As one example, a mobile device can accompany information that it provides to the LBS regarding its locations, with information identifying the next time the device plans to report its location. The LBS can then set a timer or otherwise track elapsed time since the device reported its location, and can indicate that the location information is stale if the time has expired without hearing from the device again (or after some additional buffer time, e.g., a predetermined time period that is relative to the time for an update).

The techniques described here can be used with a variety of location-based services. In one example, a LBS helps users locate their acquaintances by gathering location data reported to the service by devices for the multiple users, and then providing corresponding information to other users who have an acquaintance relationship (e.g., through a social networking application), so that each of the users can view a map of an area, where icons corresponding to their acquaintances, and located at the last reported locations for their acquaintances, are superimposed over the map.

In certain implementations, such systems and techniques may provide one or more advantages. For example, location-based services typically rely on a variety of sensors to determine a location of a device, and those sensors can be power-hungry. Proper management of request for location information can thus extend battery life on a device substantially, without having to modify pre-existing battery management tools that might be on the device. A device that properly manages power consumption will also be a device on which a user employs more applications that would have previously consumed too much power (e.g., that would have prevented the device from operating a full day on one charge), so that the user experience on such a device improves. A vendor of such a device may then sell more devices, and a provider of location-based services may drive more users to their services. As a result, the provider may collect more in subscription revenue or in advertising revenue, and advertisers may more effectively push their message to users of mobile devices.

In general, one aspect of the subject matter described in this specification can be embodied in a computer-implemented power management method. Data representing a plurality of power management profiles for a battery-operated wireless computing device are stored on the device. The power management profiles correspond to different power consumption levels. Each power management profile defines a feature for determining a geographic location of the device from among a plurality of features that are available for determining the geographic location of the device, and a frequency for employing the feature to determine the geographic location of the device. A first battery level of the device is determined. If the determined battery level is lower than a first predetermined amount, the device switches from a first power management profile having a first consumption level to a second power management profile having a second consumption level that is lower than the first consumption level.

This and other implementations can optionally include one or more of the following features. A second battery level of the device may be determined subsequent to switching from the first power management profile to the second power management profile. If the second determined battery level is below a second predetermined amount, the device may switch to a third power management profile having a third consumption level that is lower than the second consumption level. Geographic location information may be determined for the device at a first frequency if the device is determined to be substantially stationary, and at a second frequency greater than the first frequency if the device is determined to be moving geographically. The first and second power management profiles may each define a frequency of obtaining location-based measurements. Location-based measurements are obtained at a higher frequency under the first power management profile than under the second power management profile. An application may be determined to be invoked. The application may rely on the device location to select location-specific content for display to a user of the device. A geographic location of the device may be determined in response to determining that the application is invoked using another location-based feature that is not one of the plurality of features. The plurality of features may include a transmitting cellular telephone tower identification and the another location-based feature may include space-based global navigation satellite system positioning identification.

Another aspect of the subject matter described in this specification can be embodied in a computer-implemented power management method. Information identifying a location of a particular remote computing device may be received, at a server system providing a location-based service. Information identifying a next time for an updated location from the particular remote computing device may be received with the information identifying the location. A reported location of a user associated with the particular remote computing device may be reported to be stale if an updated location is not received from the remote computing device before a predetermined time period that is relative to the identified next time for an update.

This and other implementations can optionally include one or more of the following features. Determining that a reported location of the user is stale can include adding information that indicates that a location of the user is unknown to transmissions made to acquaintances of the user as part of a friend finding application. Information that indicates that a reported location of the user is stale may be transmitted to another mobile device. An indication of a location of the user on a map and an interface element that indicates that the location of the user is stale may be presented on a display device of the another mobile device.

Another aspect of the subject matter described in this specification can be embodied in a computer-implemented power management method. Geographic movement of the mobile device may be monitored, using a source on the mobile device, using signals from electronic beacons. A frequency for obtaining information about a location of the device may be selected based on a determination, from the monitored geographic movement, whether the device is moving or stationary.

This and other implementations can optionally include one or more of the following features. A battery level for the mobile device may be monitored. The frequency obtaining information about the location of the device may also be based on the monitored battery level for the mobile device. The source on the device may be selected from a plurality of sources for monitoring geographic movement of the mobile device using signals from electronic beacons. The selection of the source may be based on the determination, from the monitored geographic movement, whether the device is moving or stationary. The plurality of sources may include a transmitting cellular telephone tower identification unit and space-based global navigation satellite system positioning unit. A lower frequency for obtaining location information may be selected if the device is stationary and a higher frequency for obtaining location information may be selected if the device is moving. The device may be determined to be moving by identifying a first cluster of transmitting antenna cell regions. The first cluster of cells may include a first cell associated with the location of the device. The first cluster of cells may form a clique that is based on a first cell that includes a location of the device and a list of cells that the device has historically been located within. A determination can be made that the device has changed locations to a different cell. A second cluster of cells forming a clique based on the different cell can be identified. A determination that the first cluster is not the same as the second cluster can be made. Determining that the device is stationary despite a change in cell by cam be performed by identifying a first cluster of transmitting antenna cell regions. The first cluster of cells can include a first cell associated with the location of the device. The cluster of cells may form a clique that is based on a first cell that includes a location of the device and a list of cells that the device has historically been located within. A determination can be made that the device has changed locations to a different cell. A second cluster of cells forming a clique based on the different cell can be identified. A determination that the first cluster is the same as the second cluster can be performed.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for managing the use of location identifiers on a computing device so as to increase battery life on the device. Such techniques may include setting a particular period at which a device will check its location based on whether the device is determined to be moving or stationary. (In this context, the concepts of moving and stationary are not absolute, but depend on whether the motion is sufficient to warrant recognition that a device has changed status. For example, from a location-based system level, motion of a few feet is irrelevant because the device has not moved enough to support reporting a new location to other users.) Updates to the device's location may be made frequently when the device is moving, because prior reported locations will quickly be far from the user's current location, and will thus become functionally stale quickly. Updates may be made less frequently when the device is stationary, such as determined by cell ID or WiFi access point information.

Figure 1:
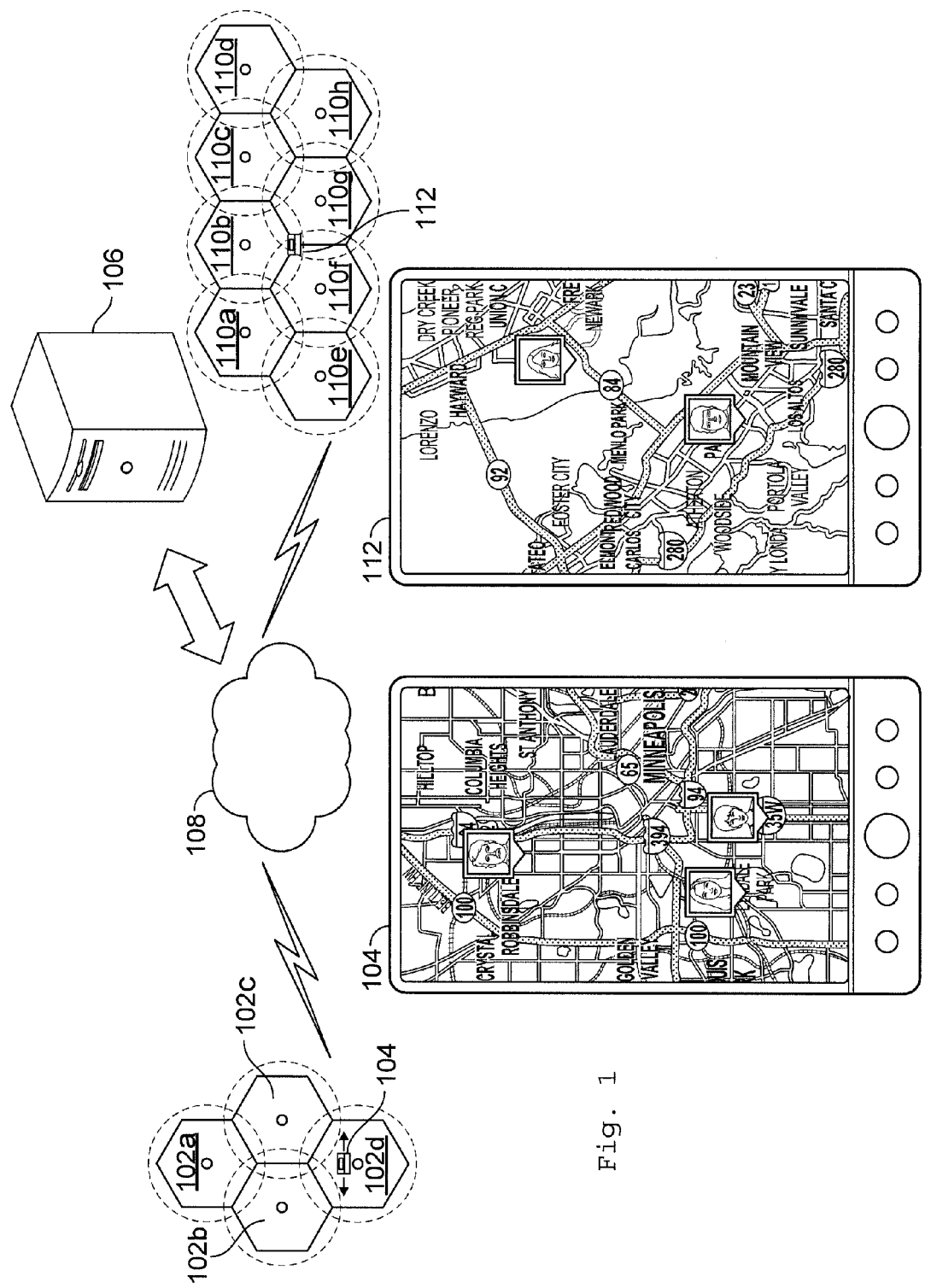
FIG. 1 is a conceptual diagram of a wireless communication system that provides location based services.

FIG. 1 is a conceptual diagram of a wireless communication system 100 that provides location based services. The system centers around two mobile devices 104, 112 that are employed by users who are registered with a location-based service offered by a company that operates server system 106. The server system 106 may include a number of different servers and sub-systems of servers for providing a number of services over a network 108, such as the internet. For example, the server system 106 may provide search results, maps, e-mail hosting, and many other such services.

In this example, the service being employed on devices 104, 112 is an application for finding the current location of acquaintances. Such a service may be provided where multiple users are registered with the service, and elect to have information that reflects their current geographic location reported to server system 106. To address privacy concerns, users may be explicitly asked to opt into such a system, and the system may be operated only at particular times, such as when an acquaintance finder application is operating in the foreground or background on the device 104, 112.

In this example, the user associated with device 104 is looking at a map of the area around downtown Minneapolis, and is being shown images of three different acquaintances. Each of those acquaintances may have previously agreed to let the user of device 104 see their location information. The images are superimposed on the map of Minneapolis at locations where the devices for those users were previously (and recently) reported in to the server system 106. Likewise, the user of device 112 has aimed their device at the Silicon Valley area, and is looking at two of their acquaintances. The user of device 104 could be one of the people shown on device 112, and the user of device 112 may be one of the people shown on device 104.

The accuracy of the locational representations on the maps is a function of the accuracy of a location determination system for each of the devices 104, 112, the speed at which each user is moving, and the time since the last location updates (the latency). A fast-moving device that has not reported its location in a long time is likely to be relatively far from the location reported by server system 106. Great accuracy can be achieved by constantly checking a GPS unit on one of devices 104, 112 and reporting any substantial changes in position (e.g., more than several feet) to the server system 106 for distribution to other users. However, GPS tends to be a power hungry location determination technique that can cut battery life in half or worse.

As a result, other location sensing mechanisms can be used that are not so power-hungry, such as cell ID and WiFi node determinations. In the figure, portions of two cell networks around device 104 and device 112 are shown, respectively. The first network portion includes four towers 102a-d, with device 104 located near tower 102d. The second network portion shows eight towers 110a-h, with device 112 located nearly equidistant between towers 110b, 110f, and 110g. For clarity, the towers are shown in the figure as being arranged in a rectilinear grid, although their physical arrangement would be much less regular in practice.

The locations of the devices can be estimated by determining the identity of a tower (for cell ID's) or access point (for WiFi) or other similar beacon with which a device 104, 112 is communicating. In general, such localization (e.g., in GSM-network device location) may use multilateration that is device-based or network-based. The localization of a device may be determined by the beacons with which the device is communicating (and perhaps using beacons that it previously communicated with, such as when extrapolating a device location in a direction of its last-observed motion) and by the strength of signal of those beacons. For example, if a device is receiving signals from three towers, it can be assumed to be between or near the towers, and if its strongest signal is from a particular tower, it can also be assumed to be closest to that tower, all other factors being equal.

However, because network cells are discontinuous, non-smooth, and overlapping, the accuracy of such locational systems may be limited For example, relatively small variations in a device's location or its radio environment may cause a device to switch between cells even if the device really has not moved an appreciable amount. Where a system changes its monitoring behavior based on whether a device is moving or not (e.g., by determining location more often when the device is moving), it can be more important to identify such small or non-existent motion as a false positive. Such determinations may be improved by treating cells that are near each other as a cluster, and setting a device's status (and by extension, its user's status) as moving or stationary based on whether the user has changed clusters. Each cell can represent a region in which a stationary cellular transmission antenna and a mobile device are able to communicate. Particular techniques for doing so are discussed more completely with respect to FIG. 3C below.

In such a manner, high-powered locational mechanisms like space-based global navigation satellite system receiving units (e.g., global positioning system (GPS)) may be reserved for times when it is observed that the user is particularly interested in an LBS, such as when an LBS application is the focus of a graphical user interface (e.g., it is in an active desktop window). Lower-powered mechanisms like cell ID (e.g., cell of origin mobile positioning that relies on an identification of a location of a base station or an antenna at the base station) and WiFi may be used at other times, and may be rationed so that they are triggered less often when a device is stationary than when it is moving. Satellite systems, cellular towers, and WiFi transmitters may be considered electronic beacons. This combination of techniques can substantially extend battery life, as discussed next.

Figure 2:
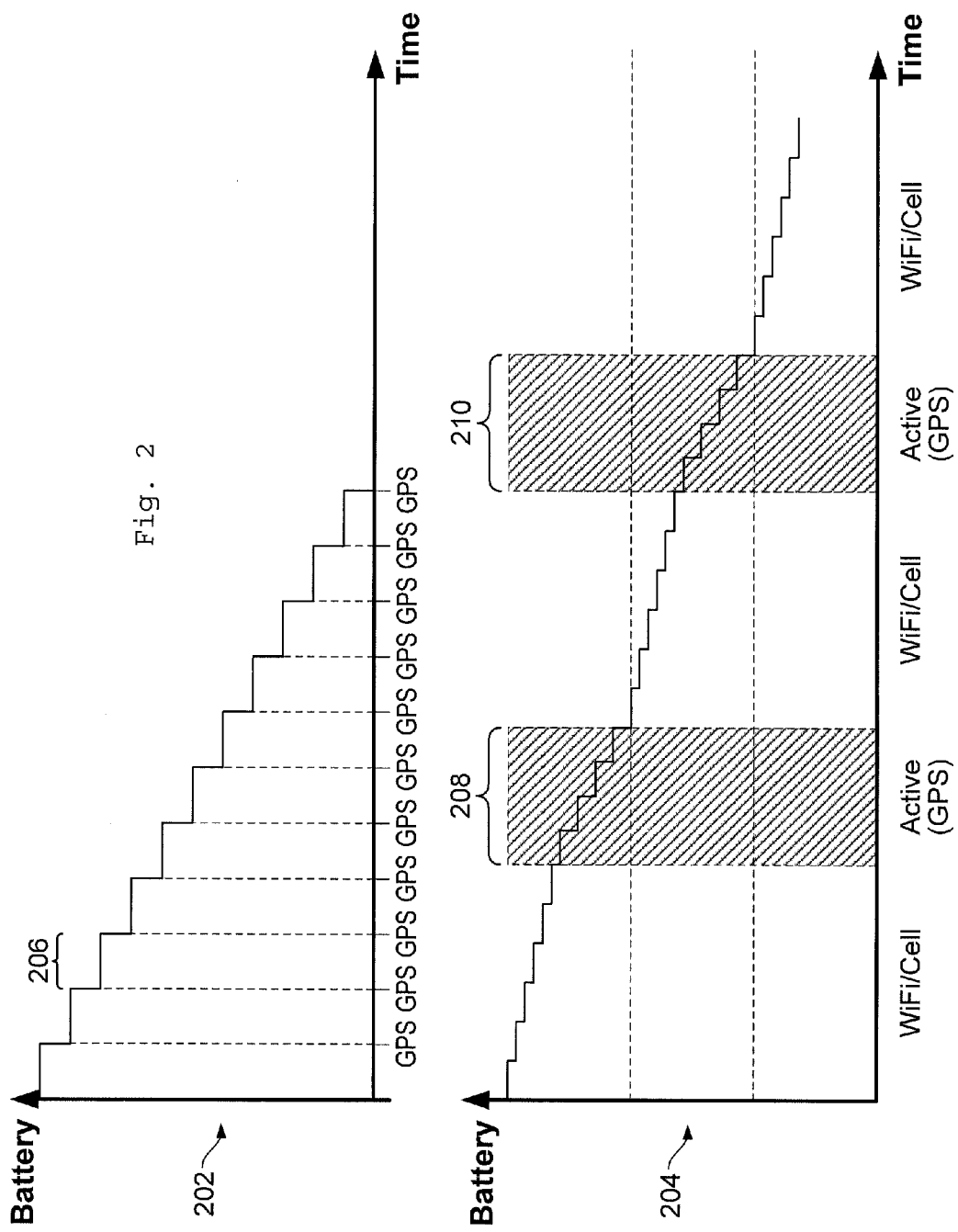
FIG. 2 shows graphs of battery power for devices that do not, and do, manage electrical consumption by location based services.

FIG. 2 shows graphs of battery power for devices that do not, and do, manage electrical consumption by location based services. The top graph 202 shows remaining battery power for a device that triggers a GPS reading at a constant period, such as every two minutes. As can be seen, the battery power takes a substantial hit each time the GPS functionality is used, and the battery dies quickly as a result.

In the bottom graph 204, GPS is used only when the location-based application is active, such as by being the focus of a graphical user interface. During these periods, the drain on battery is equivalent to the top graph, but these periods make up a relatively small portion of the device's total operational life. Rather, between times in which the location-base application is a focus, WiFi, cell ID, or a combination of the two is used to determine and report device location. As can be seen, the drain for each such determination is much less than when GPS is used. The drain can be reduced even more by hitting those services less often, such as when the device is not moving by any appreciable amount. And the downward slope can be reduced even more if the utilization of some or all of the location techniques is reduced as a function of a level of battery life that is determining to be remaining.

With respect to the difference between using GPS and other mechanisms to determine locations, calculations performed on a Nokia S60 device indicate that a network transaction over 3G takes at least 1 mAh (1.2 if the context is kept open), and a transaction over WiFi takes 0.75 mAh. Reading a GPS takes 1 mAh, while a WiFi scan takes only 0.1 mAh. Thus, for that device, intelligent selection and timing of location determinations, and of the reporting of such determinations, can significantly increase battery life.

Figure 3A:
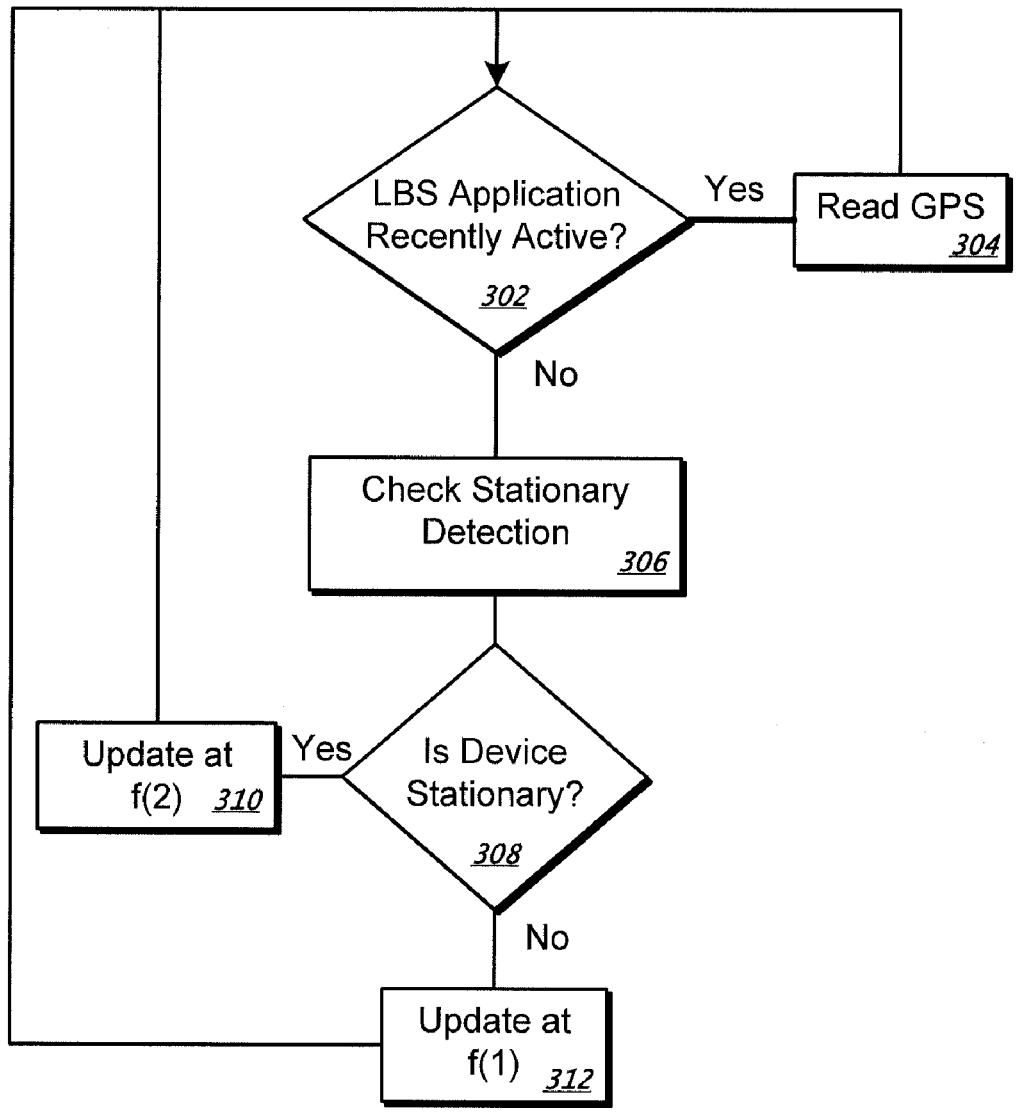
FIGS. 3A and 3B are flow charts of example processes for updating a mobile device's location based on movement of the device.
Figure 3B:
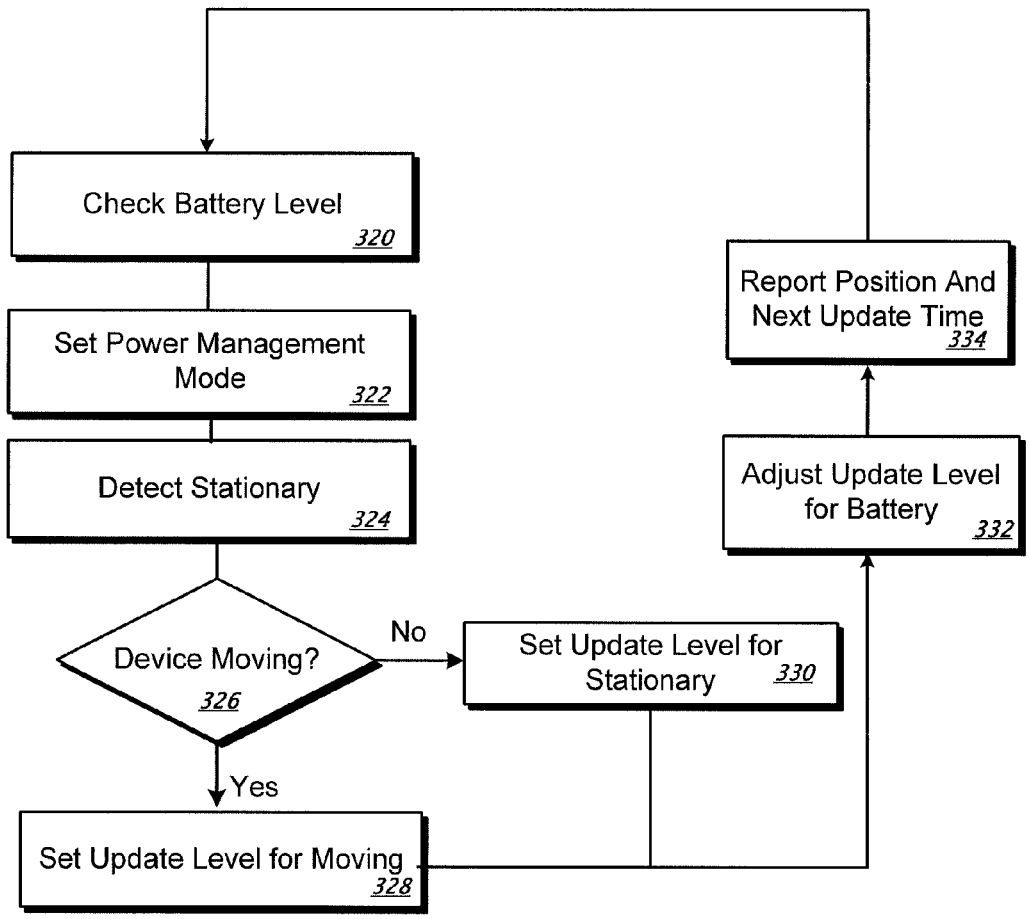

FIGS. 3A and 3B are flow charts of example processes for updating a mobile device's location based on movement of the device. FIG. 3A focuses on the type of location determination and the frequency with which the determination is made in general. The types include GPS and a lower-power determination such as cell ID of WiFi (or both). At box 302, the process of FIG. 3A first determines whether a location-based application is, or was recently, active. If so, then the device may take a GPS reading and may submit the reading over a network if the location has changed sufficient from the last reading (such a round trip with the network may also retrieve location information for other users so that such information may be used to plot locations of the other users on an electronic map). In one particular implementation, GPS may be read while the application is in focus, and for 15 minutes after it stops being the focus (under the assumption that the user may return to it soon), and the readings occur approximately every 3 minutes. This will permit a user who is very interested in the application to see and provide very accurate and up-to-date location information.

If the application has been out of focus for a sufficient time, the process checks whether the device is stationary or moving (box 306). Such a check may involve looking at clusters of cells around the device, such as by the process discussed with respect to FIG. 3C below. If the device is not stationary (box 308), then the device may read and send location updates to server at a first frequency, such as every 3 minutes (box 312). If the device is stationary, the device may read and send updates at a second, longer frequency, such as every 40 minutes. The device may also be set to react to all cell id changes, and may make a determination of whether the device is stationary or moving when such changes occur. After a cell id change, location determination and reporting may occur at a particular frequency for a predetermined time period, and may drop to a lower frequency after a period of no motion and no cell id changes either.

In summing up one example location reporting schedule, when the location-based application is in focus or in the foreground, WiFi, cell id and other beacon based location determination mechanisms operate according to a set schedule, and the GPS performs location look-ups. Updates may be sent to a remote server system on a predetermined schedule.

When the application is not the focus, or is in the background, WiFi scans may occur every 3 minutes (or another predetermined interval that may be reduced if the battery level drops) and cell id remains active also. Whether the device is stationary or moving may also be calculated to determined whether or not to change the frequency for scanning. GPS may not be used. And when the device determines to send an update to the server system, it syncs to a WiFi scan interval, looks up current cell and WiFi with the location-based application (if they are not already known) and sends the location update. Of course, should a GPS reading be taken at the initiative of a different application, the above described application can update its present location.

For example, the device may know its location from a recent reading of a GPS unit or from cell ID. The device may send updates to a server letting the server at a lower frequency know that it is still in the last determined position if the device is determined to be stationary. The device may send more frequent updates if the device determines that it is moving. The server can use the received updates to inform other mobile devices of the device's location.

FIG. 3B shows a similar process to that shown in FIG. 3A. For example, like in FIG. 3A, determinations are made regarding whether a device is moving or stationary (boxes 324 and 326), and update levels (e.g., frequencies for updating) may be set based on such a determination (boxes 328 and 330).

However, in FIG. 3B, the process also reacts to changes in battery levels on the device. Thus, at some point in the cyclical process—in this example, at the beginning—the device checks its own battery level (box 320) and sets a power management mode (box 322) (also called a power management profile) based on the determined battery level. Such a power management mode may define a modification to the various parameters that control the method discussed in FIG. 3A, such as the frequency and period of location measurement and reporting on a device. For example, the frequency of updating may be dropped from once every 3 minutes to once every 6 minutes if the battery drops below 50%, and once every 9 minutes if the battery drops below 30%—with the feature shut off entirely at 15%. Thus, at box 332, the process implements a new update level that is tied to the particular power management mode, and at box 334, the device reports its position and its next update time to a remote server system.

In the last step (box 334), one point bears additional attention. In particular, the device provides an indication to the server system of its next expected update time. In particular, because the timing of updates is variable in this example, and is controlled on the client side, the server system does not necessarily know when it "should" hear from the client again. This creates a problem in the server being able to tell other users about how fresh the first user's location is. Although it can provide an indication of the number of minutes since the first user's device reported in, that indication might not reflect whether such delay is expected, or reflects that the user's device is not working properly and that the user is far away from their last-reported location.

Thus, where a device is moving quickly, it will expect to update its position frequently, and can tell the server system as much. A delay that exceeds or substantially exceeds that time period may be a strong indication that something is wrong, and also an indication that the fast-moving user has probably gone a long way since their last report. In contrast, a slow-moving or non-moving user may not check in very often at all, and can tell the server system as much, so that the server system may provide an appropriate context to other users when reporting how fresh or how stale the original user's location information is—where absolute time since a prior update is not an accurate indication because of the variability with which each device can control its reporting frequency.

Although not shown here, reporting of motion for a device may also rely on non-location based sensors such as a compass or accelerometer in a device. For example, if a device is not moving at all (e.g., it is simply sitting on a desktop), its accelerometer may be sensing nothing, and will be more sensitive to a total lack of motion than the other mechanisms described above. As such, if a device is set to a state of being stationary, that state may stay unchanged, and other motion determining mechanisms may be avoided, until the accelerometer reports some level of movement.

Figure 3C:
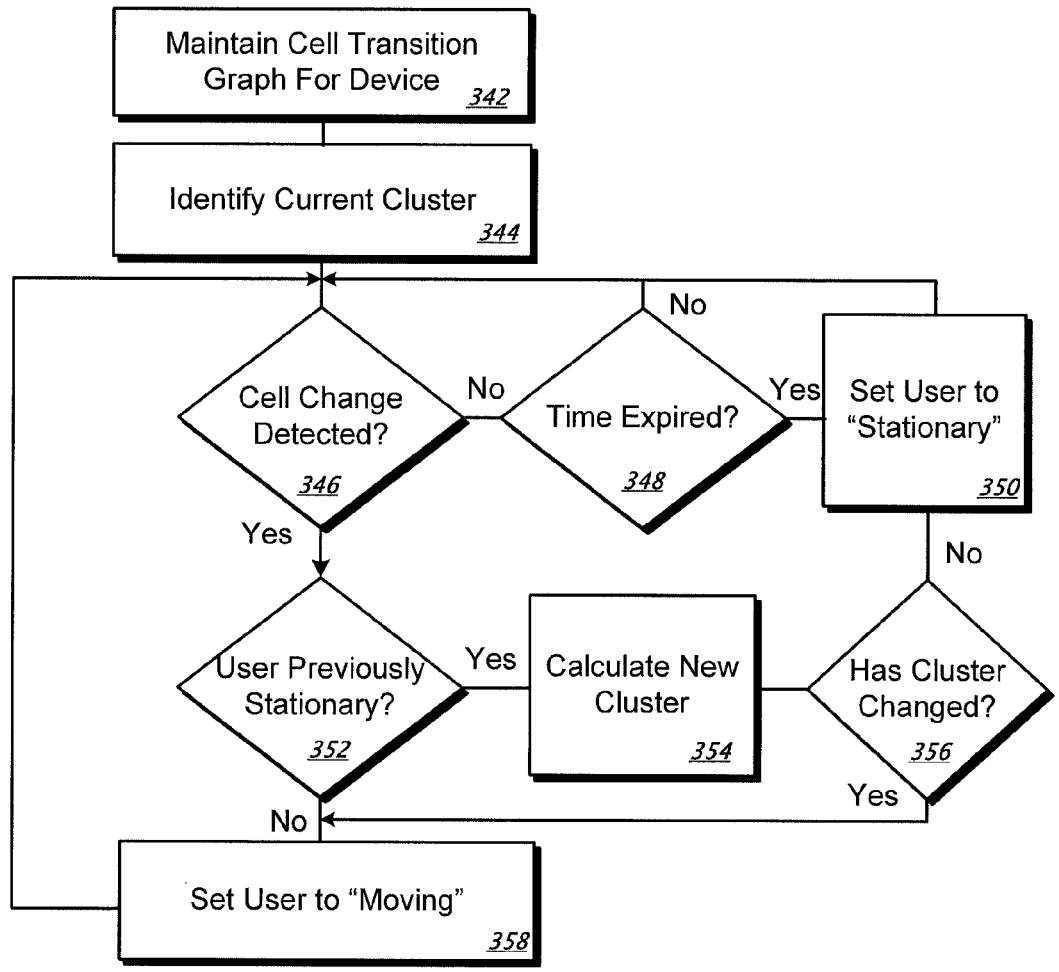
FIG. 3C is a flow chart of an example process for determining whether a mobile device is moving.

FIG. 3C is a flow chart of an example process for determining whether a mobile device is moving. As noted above, such as process may be used to reject spurious changes that are sensed in the location of a device, such as when the device does not move at all (but, e.g., a cell ID changes because of atmospheric changes in the area of the device), and also when the device moves an insignificant amount but is still in the same general area. The process begins by a system maintaining a cell transition graph for a device, which represents cell ID's that a device has passed through, along with, potentially, other information, such as the transition times. The graph may be undirected and include, for example, 100 cells. The cells may be least recently used (LRU) or time-spent-weighted LRU, such as using an exponential weighting.

At box 344, the process identifies a current cluster, which is considered to be the maximum set of cells from consecutive cell history points that form a clique in the graph. (A break in the history can be inferred if the user stays in the same clique longer than a predetermined period of time.) In some implementations, a clique may be a maximum number of cells from consecutive cell history points that are adjacent to each other.

At box 356, the process determines whether the cell for a device changes. If such a change is detected, it is determined whether the device was previously considered to be stationary (box 352). If it was considered to be stationary before the change, a new cluster for the device may be calculated in the manner discussed above (box 354). If the new cluster is unchanged (box 356), then the device may be considered to be stationary; otherwise, the device is considered to be moving (box 358). The device may also be considered to be moving if the cell change indicates that it is moving.

If no change in cell is detected at box 346, the user is considered to be stationary after a predetermined period of time without a change in cell, such as 10 minutes, for example (box 350). The location for a user is then determined based on whether they are considered to be stationary or moving. If they are considered to be stationary, then their current location is described as the cell cluster. If they are considered to be moving, then their current location is described as the current cell.

Figure 4:
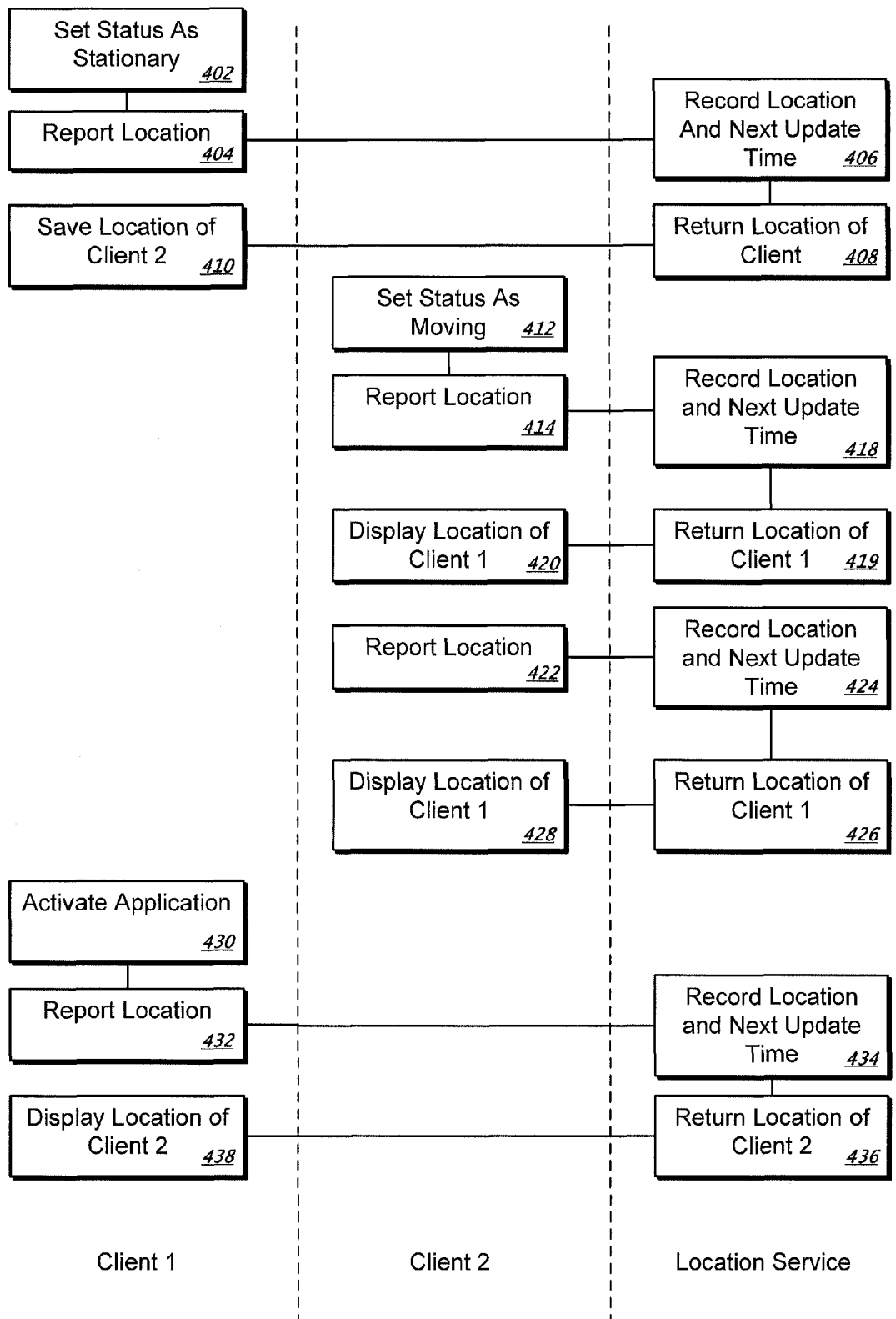
FIG. 4 is a swim lane diagram showing a process for sharing location information for certain mobile devices with other mobile devices.

FIG. 4 is a swim lane diagram showing a process for sharing location information for certain mobile devices with other mobile devices. In general, the process shows messages that may be exchanged between a Location Service, which may be implemented as a central server-based system, and two client devices operated by users who have registered accounts with the Location Service. In general, the user could be using a wide variety of location-based applications for which control over location detection is desired to increase battery life. In this example, they are exchanging their location information with each other, such as in the manner discussed above with respect to FIG. 1.

Client 1 starts the process by setting its status as stationary (box 402), and then as reporting its location (box 404). Such a report may also include an indication of when Client 1 next expects to report in. Because the device has set itself as in a stationary mode, that time may be a relatively long time. The Location Service records the location information and the next update time information at box 406, and returns to Client 1 those most recent known location of Client 2 (box 408), which Client 1 may display in a location-based application. In this manner, the process treats the reporting of Client 1's location as a "pull" for information from other clients belonging to users who are registered in the system as having a friend or acquaintance relationship with the user of Client 1.

At box 412, Client 2 sets its status as moving, such as by using the process described with respect to FIG. 3C, and reports its location (box 414). Client 2 can also report an expected time until a next update, which in this example may be relatively short because Client 2 is on the move, and thus needs to provide relatively frequent reports if its reported position is to accurately match its true position. Again, the Location Service records the location of Client 2 and the next update time computed by Client 2 and reported to the Location Service (box 418). And as before, the Location Service returns the last reported location (from box 404) of Client 1 to Client 2 under the assumption that Client 2 would like an update if it is providing an update (box 419). Client 2 then displays the information, such as via an icon showing the last reported location of Client 1 superimposed on a map of the area around that location (box 420).

Because Client 2 is moving and is thus updating its location more often, it is the next device to report an updated location (422) which again may be accompanied with an indication of a next expected time to report in. And again, the Location Service can record the received information (box 424), return the location of Client 1 to Client 2 (a location that has not changed), and have Client 2 display such unchanged information (box 428). The information about client 1 can be changed in certain relevant ways even if the reported location of Client 1 has not been updated. For example, if the time for Client 1 reporting in again has expired, the Location Service at box 426, can accompany the information with an indication that the location information for Client 1 is to be considered stale or potentially inaccurate in a more-than-acceptable manner. The Location Service alternatively, or in addition, may transmit information so that Client 2 can indicate the absolute time since Client 1 last checked in. Such a number does not have the same context to it, but it could provide a viewer with an indication of how stale the location information for Client 1 might be.

Figure 5:
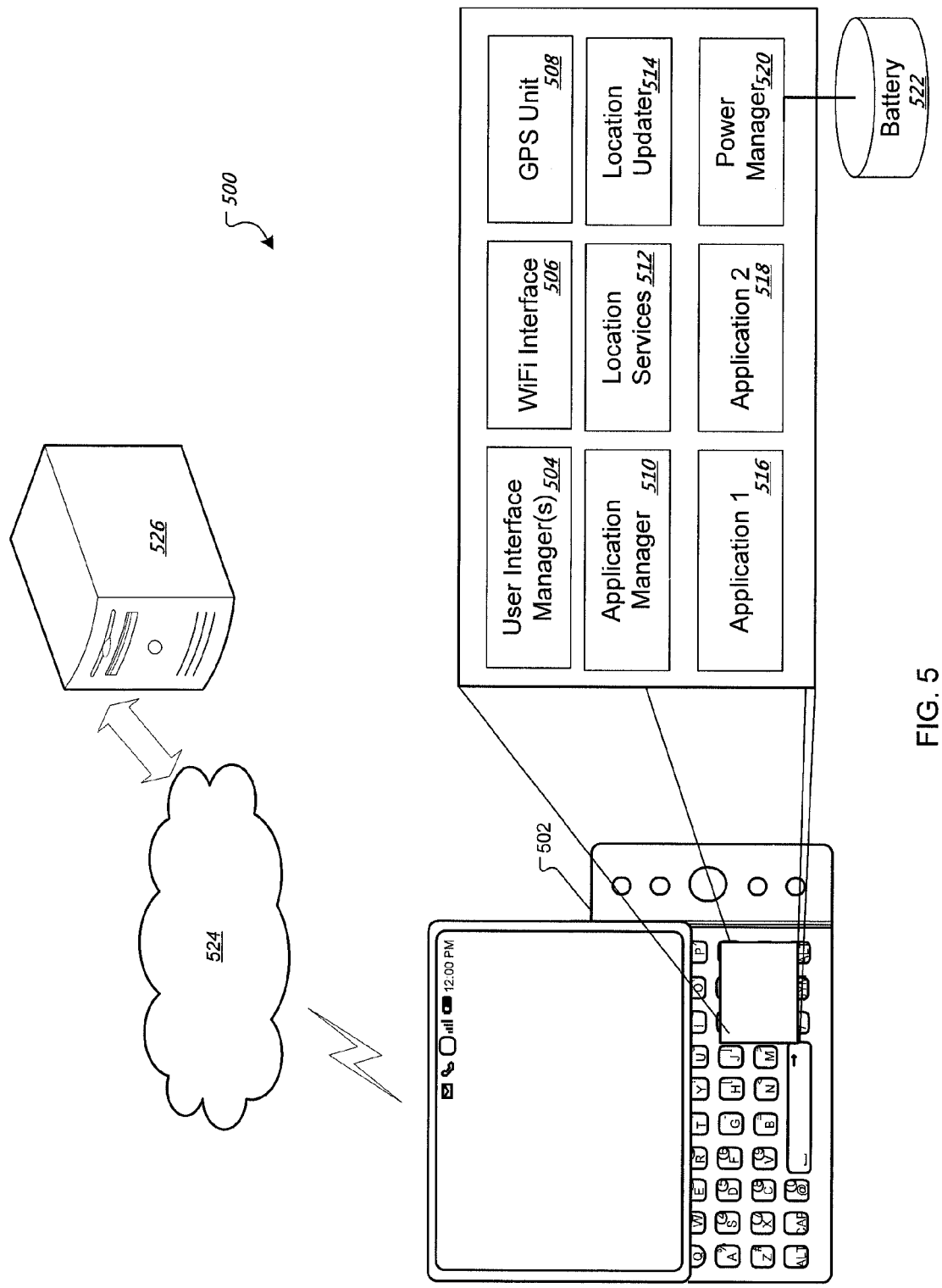
FIG. 5 is a schematic diagram of a mobile device having power management and location determination components.

FIG. 5 is a schematic diagram of a mobile device 502 having power management and location determination components. The device 502 operates within a computer system 500 that includes a location-based services server 526, which can provide services to, and communicate with, mobile device 502 over network 524, such as the Internet. The server 526 may provide information such as that discussed above.

The device 502 is shown schematically as including a number of components that are directed to allowing the device 502 to deliver services that involve reporting of geographic location for the device 502, and to do so in a manner that does not unduly drain power from device battery 522. A first component is a user interface manager or managers 504, which may be responsible for providing output (e.g., in a screen of device 502) and receiving and interpreting input (e.g. from a touchscreen) in a familiar manner. An application manager 510 may in turn be a portion of an operating system on the device 502 that may manage the launching and utilization of various custom applications that a user may have loaded or downloaded onto device 502, such as from an on-line application store. The application manager 510 in this example addresses two applications—application 1 (box 516) and application 2 (box 518). Either or both of the applications may be location-based applications that need to receive information regarding the current geographic location of device 502. Such access may occur by a general location services module 512, which may register applications that want access to information about device location and may obtain the information from the device, and may interface with the applications or application manager 510 to distribute such information, especially when multiple applications want the information at the same or substantially the same time.

A location updater 514 is a component that controls how often the location services module 512 seeks new location information, and also how often location information is reported to server 526. The location updater may operate in manners discussed above to determine times at which to seek location information, and sources from which to get the information. The location updater 514 may also interface with a power manager 520, such as to determine a remaining level of battery power available in a device, so as to change a frequency with which location information is sought.

Finally, the location services module 512 can be controlled by location updater 514 with respect to when it asks WiFi interface 506 and GPS unit 508 for location information. As indicated above, the location services module 512 may also interface to obtain information from an accelerometer on the device 502.

In this manner, the location updater may assist the power manager 520 in maintaining battery power on the device 502, by establishing a schedule for obtaining location information and an indicator of which component such information is to come from, in order to extend battery life for the device 502.

Figure 6:
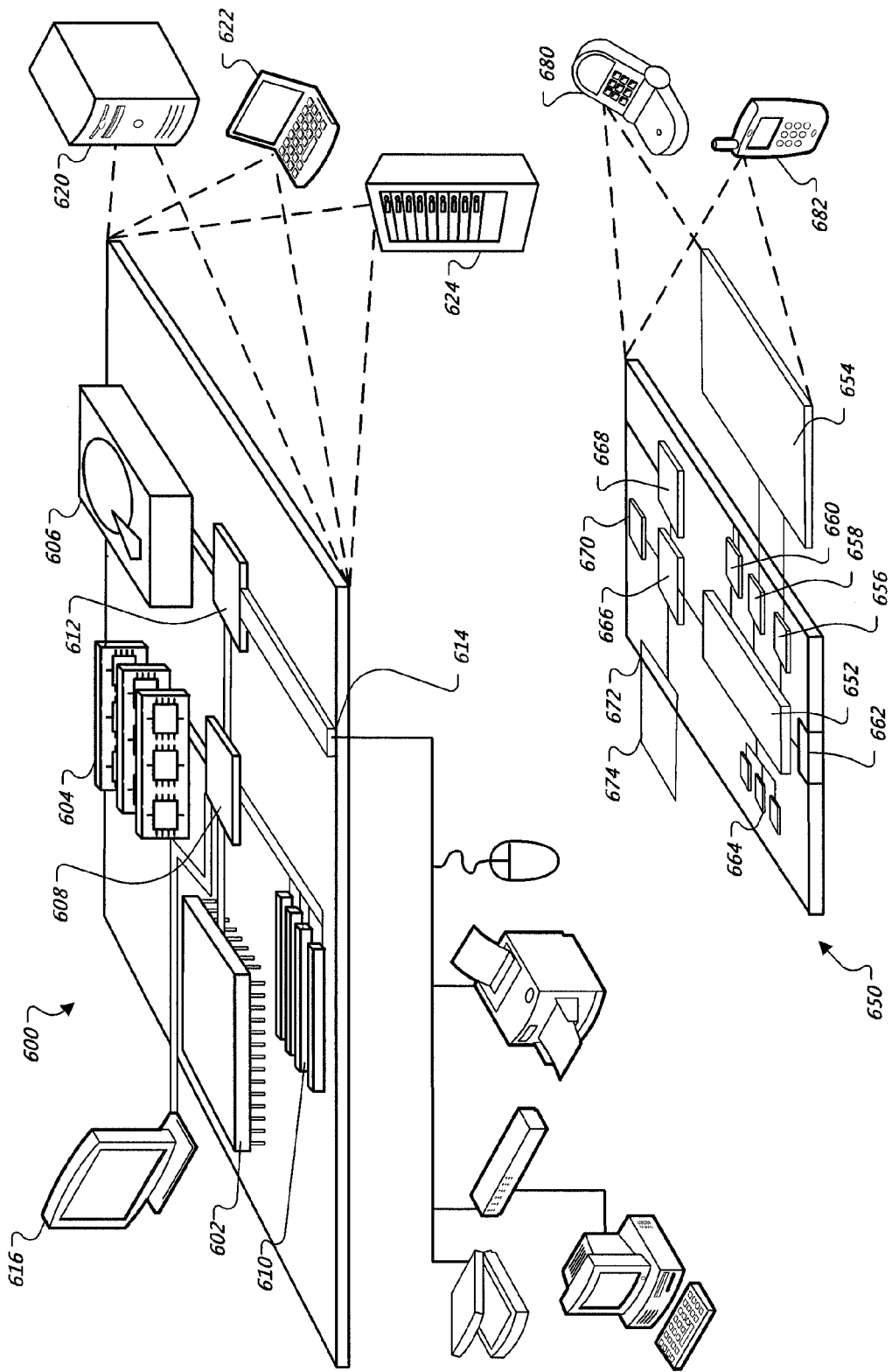
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular techniques for managing access to location-providing components of a battery operated system, other forms of managing activity to extend battery life may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A battery-powered mobile computing device comprising:
 a battery to provide power;
 a processor;
 a Global Positioning System (GPS) component to obtain information about the geographic location of the device, wherein:
  the information about the geographic location of the device obtained using the GPS component has a first degree of accuracy, and
  obtaining information about the geographic location of the device using the GPS component consumes a first amount of battery power;
 a wireless communication interface to obtain information about the geographic location of the device, wherein:
  the information about the geographic location of the device obtained using the wireless communication interface has a second degree of accuracy that is less than the first degree of accuracy, and
  obtaining information about the geographic location of the device using the wireless communication interface consumes a second amount of battery power that is less than the first amount of battery power; and
 a memory storing instructions executable by the processor, the instructions including:
  first instructions corresponding to a first applications that utilize information about a geographic location of the device;
  second instructions corresponding to a location updater module, the location updater module to request either the GPS component or the wireless communication interface to obtain information about the geographic location of the device; and
  third instructions corresponding to a location services module, the location services module to:
   register the applications for access to information about the geographic location of the device;
   determine whether any of the applications is active or was active at any time during a previous specified period of predetermined length; and
   control the location updater module regarding whether to use the GPS component or the wireless communication interface to obtain the information about the geographic location of the device based, at least in part, on a determination as to whether any of the applications are active or were active at any time during a previous specified period,
  wherein the location services module controls the location updater module to use the GPS component to obtain the information about the geographic location of the device if any of the applications that utilize information about the current geographic location of the device are active or were active at any time during the previous specified period, and
  wherein the location services module controls the location updater module to use the wireless communication interface and not the GPS component to obtain the information about the geographic location of the device if no application on the battery-powered mobile computing device that utilizes information about the current geographic location of the device is active or was active at any time during the previous specified period.

2. The battery-powered mobile computing device of claim 1 wherein the wireless communication interface comprises a WiFi transceiver.

3. The battery-powered mobile computing device of claim 1 wherein the location services module controls the location updater module to request information about the geographical location of the device at a frequency that depends, at least in part, on an extent to which the device is moving.

4. The battery-powered mobile computing device of claim 1 wherein the location services module controls the location updater module to request information about the geographical location of the device at a frequency that depends, at least in part, on whether or not the device is determined to be substantially stationary.

5. The battery-powered mobile computing device of claim 1 comprising a power manager to determine a remaining level of battery power available in the device, wherein the location services module controls the location updater module to request information about the geographical location of the device at a frequency that depends, at least in part, on the remaining level of battery power.

6. The battery-powered mobile computing device of claim 5 wherein the location services module controls the location updater module to update information about the geographical location of the device at a lower frequency if the remaining level of battery power drops below a predetermined amount.

7. A method of operating a battery-powered mobile computing device having a processor, a memory, and a battery, the method comprising:
 determining, by the device, whether an application that is available on the device and that uses information about a current geographic location of the device is active or was active at any time during a previous specified period of predetermined length;
 using, by the device, a first location-determining technique to determine the geographic location of the device if the application is active or was active at any time during the previous specified period of predetermined length, wherein the first location-determining technique uses a first amount of battery power; and
 using, by the device, a second location-determining technique to determine the geographic location of the device if no application available on the device is active or was active at any time during the previous specified period of predetermined length, wherein the second location-determining technique uses a second amount of battery power that is less than the first amount of battery power.

8. The method of claim 7 wherein the first location-determining technique uses information from a GPS system.

9. The method of claim 8 wherein the second location-determining technique uses cell ID or a WiFi access point information.

10. The method of claim 7 wherein information about the geographic location of the device obtained using the first technique has a first degree of accuracy, and information about the geographic location of the device obtained using the second technique has a second degree of accuracy that is less than the first degree of accuracy.

11. The method of claim 7 wherein the application is considered to be active if the application is the focus of a graphical user interface on the device.

12. The method of claim 7 including requesting information about the geographical location of the device at a frequency that depends, at least in part, on an extent to which the device is moving.

13. The method of claim 7 including requesting information about the geographical location of the device at a frequency that depends, at least in part, on whether or not the device is determined to be substantially stationary.

14. The method of claim 7 including updating information about the geographical location of the device at a frequency that depends, at least in part, on a remaining level of battery power in the device.

15. The method of claim 14 including updating information about the geographical location of the device at a lower frequency if the remaining level of battery power drops below a predetermined amount.

16. A non-transitory computer-readable medium encoded with a computer program comprising instructions that, if executed by a processor of a mobile computing device, operate to cause the mobile computing device to perform operations comprising:
   determining whether an application that is available on the device and that uses information about a current geographic location of the device is active or was active at any time during a previous specified period of predetermined length;
   using a first location-determining technique to determine the geographic location of the device if the application is active or was active at any time during the previous specified period of predetermined length, wherein the first location-determining technique uses a first amount of battery power; and
   using a second location-determining technique to determine the geographic location of the device if no application available on the device is active or was active at any time during the previous specified period of predetermined length,
wherein the second location-determining technique uses a second amount of battery power that is less than the first amount of battery power.

17. The medium of claim 16 wherein the first location-determining technique uses information from a GPS system.

18. The medium of claim 17 wherein the second location-determining technique uses cell ID or WiFi access point information.

19. The medium of claim 16 wherein information about the geographic location of the device obtained using the first technique has a first degree of accuracy, and information about the geographic location of the device obtained using the second technique has a second degree of accuracy that is less than the first degree of accuracy.

20. The medium of claim 16 wherein the application is considered to be active if the application is the focus of a graphical user interface on the device.

21. The medium of claim 16 including instructions that, if executed, operate to cause the device to request information about the geographical location of the device at a frequency that depends, at least in part, on an extent to which the device is moving.

22. The medium of claim 16 including instructions that, when executed, operate to cause the device to request information about the geographical location of the device at a frequency that depends, at least in part, on whether or not the device is determined to be substantially stationary.

23. The medium of claim 16 including instructions that, if executed, operate to cause the device to update information about the geographical location of the device at a frequency that depends, at least in part, on a remaining level of battery power in the device.

24. The medium of claim 23 including instructions that, if executed, operate to cause the device to update information about the geographical location of the device at a lower frequency if the remaining level of battery power drops below a predetermined amount.

25. A battery-operated mobile computing device comprising:
   a battery to provide power;
   a processor;
   a Global Positioning System (GPS) component to obtain information about the geographic location of the device, wherein obtaining information about the geographic location of the device using the GPS component consumes a first amount of battery power;
   a wireless communication interface to obtain information about the geographic location of the device, wherein obtaining information about the geographic location of the device using the wireless communication interface consumes a second amount of battery power that is less than the first amount of battery power; and
   a memory storing instructions executable by the processor, the instructions including:
      first instructions corresponding to applications that utilize information about a geographic location of the device;
      second instructions corresponding to a location updater module, the location updater module to request either the GPS component or the wireless communication interface to obtain information about the geographic location of the device; and
      third instructions corresponding to a location services module, the location services module to:
         determine whether any of the applications is active or was active at any time during a previous specified period of predetermined length; and
         control the location updater module regarding whether to use the GPS component or the wireless communication interface to obtain the information about the geographic location of the device based, at least in part, on a determination as to whether any of the applications are active or were active at any time during a previous specified period,
      wherein the location services module controls the location updater module to use the GPS component to obtain the information about the geographic location of the device whenever any of the applications that utilize information about the current geographic location of the device are active or were active at any time during the previous specified period, and
      wherein the location services module controls the location updater module to use the wireless communication interface and not the GPS component to obtain the information about the geographic location of the device if no application on the device that utilizes information about the current geographic location of the device is active or was active at any time during the previous specified period.

26. The battery-operated mobile computing device of claim 25 comprising a power manager to determine a remaining level of battery power available in the device, wherein the information about the geographical location of the device is updated at a frequency that depends, at least in part, on the remaining level of battery power.

27. The battery-operated mobile computing device of claim 26 wherein the information about the geographical location of the device is updated at a first lower frequency if the remaining level of battery power drops below a first predetermined amount.

28. The battery-operated mobile computing device of claim 26 wherein the information about the geographical location of the device is updated at a second frequency lower than the first lower frequency if the remaining level of battery power drops below a second predetermined amount lower than the first predetermined amount.

* * * * *

UNITED STATES PATENT AND TRADEMARK OFFICE
CERTIFICATE OF CORRECTION

PATENT NO. : 8,319,685 B2
APPLICATION NO. : 13/245396
DATED : November 27, 2012
INVENTOR(S) : Mika Raento, David S. Maynard and Steven J. Lee It is certified that error appears in the above-identified patent and that said Letters Patent is hereby corrected as shown below:

Column 15, line 30 (Claim 1, line 26) delete "to a first" and insert --to--.

Signed and Sealed this
Second Day of April, 2013

Teresa Stanek Rea
*Acting Director of the United States Patent and Trademark Office*